United States Patent [19]

Taniguchi et al.

[11] Patent Number: 4,908,650
[45] Date of Patent: Mar. 13, 1990

[54] WATERPROOF CAMERA

[75] Inventors: Nobuyuki Taniguchi, Nishinomiya; Takeo Hoda, Kawachinagano; Yoshiaki Hata, Nishinomiya; Manabu Inoue, Kobe; Yoshinobu Kudo, Sakai; Hiroshi Ueda, Toyokawa, all of Japan

[73] Assignee: Minolta Camera Kabushiki Kaisha, Osaka, Japan

[21] Appl. No.: 268,641

[22] Filed: Nov. 8, 1988

Related U.S. Application Data

[63] Continuation of Ser. No. 8,367, Jan. 29, 1987, abandoned.

[30] Foreign Application Priority Data

Jan. 31, 1986 [JP] Japan ................... 61-20698

[51] Int. Cl.⁴ .............. G03B 7/041; G03B 3/10; G03B 17/08; G03B 17/24
[52] U.S. Cl. .................... 354/412; 354/458; 354/476; 354/64; 354/106; 354/173.1; 354/195.1
[58] Field of Search .......... 354/64, 106, 195.1, 354/458, 412, 476, 173.1

[56] References Cited

U.S. PATENT DOCUMENTS

| 3,490,844 | 1/1970 | Sapp, Jr. | 355/40 |
| 4,033,392 | 7/1977 | Less | 354/64 X |
| 4,041,507 | 8/1977 | Ko et al. | 354/64 |
| 4,100,553 | 7/1978 | Danel | 354/64 |
| 4,324,469 | 4/1982 | Harvey | 354/214 X |
| 4,383,743 | 5/1983 | Nozawa et al. | 354/64 |
| 4,583,831 | 4/1986 | Harvey | 354/106 |
| 4,639,111 | 1/1987 | Harvey | 354/195.1 X |
| 4,647,170 | 3/1987 | Stoneham | 354/275 |
| 4,650,304 | 3/1987 | Harvey | 354/21 |
| 4,652,104 | 3/1987 | Harvey | 354/106 |
| 4,682,870 | 7/1987 | Atkinson | 354/275 |
| 4,724,448 | 2/1988 | Maeda et al. | 354/64 |

FOREIGN PATENT DOCUMENTS

| 54-26721 | 2/1979 | Japan . |
| 60-145428 | 3/1984 | Japan . |
| 61-24981 | 7/1986 | Japan . |

Primary Examiner—Michael L. Gellner
Attorney, Agent, or Firm—Burns, Doane, Swecker & Mathis

[57] ABSTRACT

The disclosure relates to a waterproof camera which comprises a switching member for selecting a real focal length photographing mode and a pseudo focal length photographing mode, a recording member for recording a code denoting the pseudo focal length photographing mode to be recorded on a film when the mode is selected, and a waterproof member for preventing water from entering inside the camera. This is capable of producing the print from the film which is equivalent to that obtained when the angle of view is changed at the time of photographing, without enlarging the outside dimensions of the camera body.

28 Claims, 8 Drawing Sheets

WATERPROOF CAMERA

This application is a continuation, of application Ser. No. 008,367, filed January 29, 1987, now abandoned.

BACKGROUND OF THE INVENTION

1. Field of the invention

The present invention relates to a waterproof camera usable both on land and under water.

2. Description of the prior art

Conventionally, there has been provided a number of waterproof cameras with waterproof casings to enable underwater photographing.

In the waterproof cameras according to the prior art, however, the lens mount of the camera body and the body mounts of the lens barrels in the plurality of interchangeable lenses are not waterproofed. Thus, in the case of the waterproof camera having such construction, it is impossible to change the interchangeable lens in the water for such purposes as the alteration of the angle of view of the photographing optical system, since such attempt will inevitably cause the water to enter inside the camera body and lens barrel.

As one of the solutions to this problem, there may be provided a method using the front converter to change the focal length which is to be attached in front of the photographing lens in order to change the angle of view of the photographing optical system. The above method, however, is disadvantageous in that the front converter deteriorates the aberrations of the photographing optical system in comparison with that of the photographing lens only. Another disadvantage of the method is that the camera cannot be used on land, since the waterproof camera using said front converter is operable on the condition that the space between said front converter and photographing lens is filled with the water.

Furthermore, in the method using interchangeable lenses and a front converter to change the angle of view to be photographed, such lenses and converter need to be carried separately from the camer, and this is especially disadvantageous for waterproof cameras, since the freedom in the movement of the user is restricted because of this.

As another solution to said problem, there may be provided a method that enables the change of the angle of view without using such things as interchangeable lenses and a front converter which are to be carried separately from the camera body, that is, a method using the zoom lens that enables the focal length to be varied or using the bifocal camera in which two different focal lengths of a photographing optical system can be selectively set. Such methods, however, when applied to the waterproof camera, increase the dimensions of the camera further because of the space required for the zooming mechanism and lens switching mechanism.

In addition the waterproof camera is generally larger than the ordinary camera because of its waterproof construction, and this is undesirable, since importance should be attached to the compactness in the case of the waterproof camera.

SUMMARY OF THE INVENTION

It is, therefore, an object of the present invention to provide a waterproof camera that is capable of producing the print from the film which is equivalent to that obtained when the angle of view to be photographed is changed at the time of photographing, without increasing the outside dimensions of the camera body.

The camera according to the present invention features a mode switching device to enable the switching between a real focal length photographing mode and a pseudo focal length photographing mode in which a smaller area would be printed than that of the real focal length photographing mode, a recording device which records a trimming signal denoting the pseudo focal length photographing mode on the frame of the film and a waterproof device to prevent the water from entering inside the camera through its casing.

According to the above construction, when the picture is taken in the pseudo focal length photographing mode, the trimming signal is recorded on the frame of film, and accordingly the picture can be trimmed at the time of printing according to said pseudo focal length photographing indication signal to produce the print covering the area narrower than that of the picture taken in the real focal length photographing mode. In other words, in the pseudo focal length photographing mode, the print is similar to that taken by a photographing lens having an angle of view smaller than the actual angle of view. Namely, the result is similar to that obtained in the case where the picture is taken using a lens of a longer focal length. Thus, the troubles of changing lenses and mounting and dismounting the front converter can be saved. Because of this feature, the camera body as the a whole can be made compact.

BRIEF DESCRIPTION OF THE DRAWINGS

These and other objects and feature of the present invention will become apparent from the following description taken in conjunction with the preferred embodiment thereof with reference to the accompanying drawings, in which:

FIG. 7 (a), 7(b), 7(c) and 7(d), taken together as shown in FIG. 7, and FIG. 8, are, respectively, flow charts showing the actions of a microcomputer incorporated into the above camera.

DETAILED DESCRIPTION OF THE INVENTION

The preferred embodiments of the present invention will be explained in details in the following in reference to the accompanying drawings.

Figure 1:
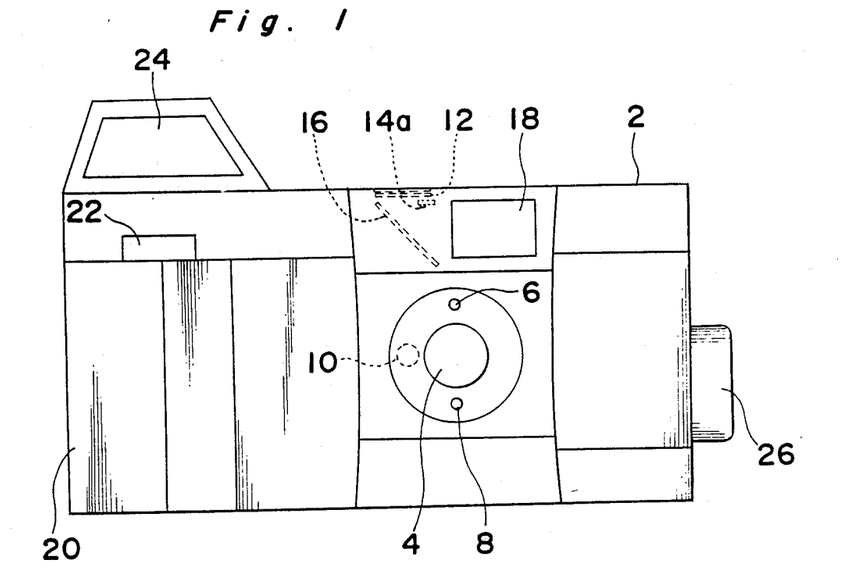
FIG. 1 shows a front view of the waterproof camera according to the preferred embodiment of the present invention.
Figure 2:
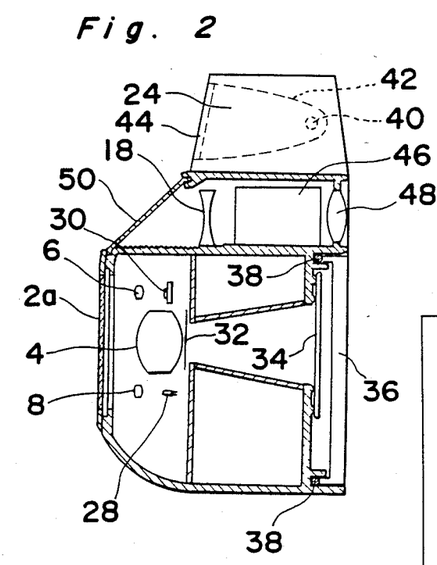
FIGS. 2, 3 and 4 are, respectively, a vertical cross-sectional view, a top view and a rear view of the camera as shown in FIG. 1.
Figure 3:
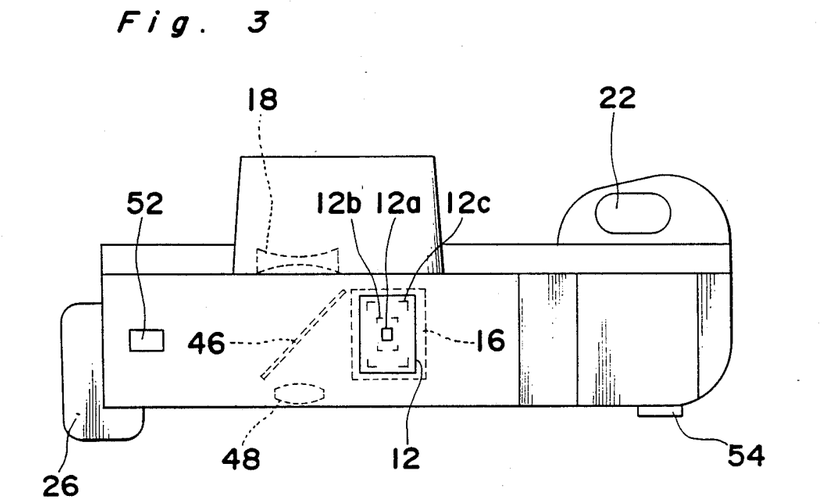

In FIGS. 1, 2 and 3, reference numerals 2 and 4 designate, respectively, the camera body and photographing lens. A pair of range-finding lenses 6 and 8 are disposed on the upper side of and lower side of said photographing lens 4, respectively. Of said pair of range-finding lenses, the upper one 6 is a light-receiving lens and the lower one 8 is a light-projecting lens. The range-finding system comprises the light-projecting lens 8 and the light-receiving lens 6 so that the light beam can be projected to an object through the light-projecting lens 8 and the light beam reflected by the object is received by light-receiving element through the light-receiving lens 6 to find the distance to the object from the result or condition of the received light. The explanation of the details of this range-finding system will be omitted here, since they are already known publicly. A light-receiving lens 10 for measuring the brightness of object is disposed on the side of the photographing lens 4.

In the case of the camera discussed in this embodiment, the viewfinder is a bright frame finder that takes the light used for illuminating the frame through the upper surface of the camera body 2. In the case of the waterproof camera such as one described in this embodiment, the front side of the camera body is, generally, dark, and so the lighting from the upper side of the camera body 2 is advantageous over that from the front side thereof. A finder frame plate 12 to indicate the photographing range is disposed on the upper side of the camera body 2, and a light-emitting diode 14a to indicate that the camera is set to the pseudo focal length photographing mode in the visual field of the finder is disposed under the finder frame plate 12. When the pseudo focal length photographing mode is selected, said light-emitting diode 14a is lighted to let the user know that the camera is set to the pseudo focal length photographing mode. Furthermore, a light-emitting diode 14b for low brightness alarm that lights up when the measured brightness is lower than a predetermined level is disposed in the back of the light-emitting diode 14a for indicating the pseudo focal length photographing mode. Reference numeral 16 designates a mirror provided to reflect the incident light coming through the finder frame plate 12. Reference numeral 18 designates an objective lens of the finder.

A grip member 20 is provided on the left end of the front surface of camera body 2, as viewed in FIG. 1, and a shutter release button 22 is disposed on the grip member 20. Furthermore, a flash portion 24 is disposed on the upper side of camera body 2 above the shutter release button 22. Also, viewing from the front of the camera, the interval between shutter release button 22 and flash portion 24 is made larger than the moving distance of the tip of one's right forefinger for depressing the button 22, so that the fingertip will not intercept the light emitted from the flash portion 24 when it depresses the shutter release button 22. By such arrangement, the fear of having the front surface of the flash portion 24 covered with one of the fingers of both hands can be eliminated. Besides, the distance from the optical axis of photographing lens 4 to the flash portion 24 can be increased, so that the fear of getting unnatural photographs especially caused by so-called "red-eye phenomenon", the abnormal eye colors of people in the photographs can be reduced. Viewing camera body 2 from its front, a buckle 26 for the lock of back cover is disposed on the right side of the camera body 2.

In FIG. 2, Reference numerals, 28 and 30 designate, respectively, a range-finding light-emitting element, and a range-finding light-receiving element. These elements are disposed symmetrically to the optical axis of lens 4. Just behind photographing lens 4, is disposed a shutter 32. Reference numeral 34 designates a pressure plate to keep the film in a predetermined position by applying appropriate pressure to the film. The pressure plate 34 is supported by the back cover 36 which can be opened and closed to camera body 2.

The camera body 2 has a waterproof construction. The photographing lens 4 and range-finding optical system are arranged so that they face the object through waterproof glass 2a fixed to the front of camera body 2. A packing 38 for waterproofing is disposed between back cover 36 and camera body 2.

Furthermore, flash portion 24 comprises a xenon tube 40 as a light source, a reflector 42 to reflect the light emitted from the xenon tube 40 towards the object and a front panel 44 to spread the light properly. The optical system of the viewfinder comprises the objective lens 18, a half-mirror 46 and an eyepiece lens 48. The half-mirror 46 is designed to overlap the images of frame plate 12 and light emitting diode 14a with the image of the object in order to make in-finder indication. A waterproof window 50 of the camera body 2 is formed in front of the optical system of the viewfinder. The optical system of the viewfinder receives the light from the object through the waterproof window 50. The eyepiece lens 48 is fixed to the camera body 2 so as not to cause the water to enter through the gap.

Owing to such construction, the camera body 2 is so completely waterproofed that the external water is prevented from entering inside camera body 2, and the camera can be used for underwater photographing.

In FIG. 3, the finder frame plate 12 comprises a range-finding frame 12a disposed in the center of said plate, a photographing frame 12b disposed outside the range-finding frame 12a to indicate the print range in the case of photographing in pseudo focal length photographing mode, and a photographing frame 12c disposed outside the photographing frame 12b to indicate the photographing range in the case of photographing in real focal length photographing mode. A film number indication window 52 of film counter is disposed on the upper surface of camera body 2. This window indicates the number of film frames having been photographed.

Figure 4:
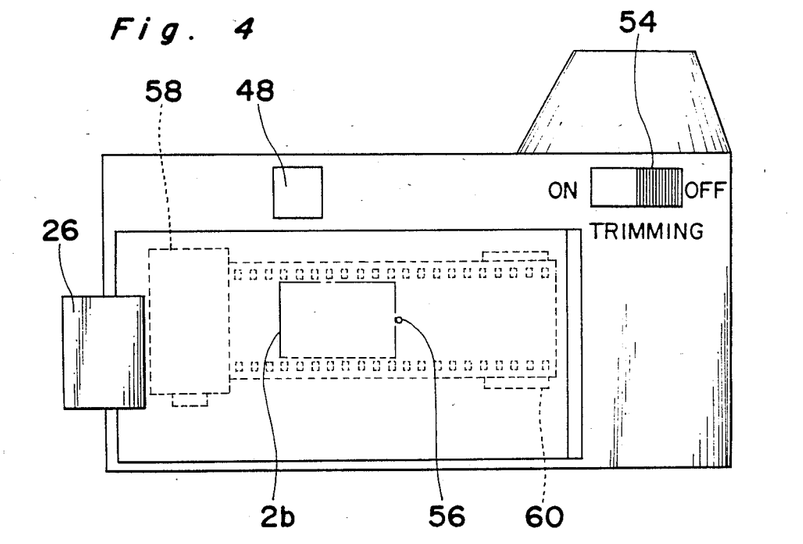

In FIG. 4, a selection switch 54 to select either of the real and pseudo focal length photographing modes is disposed in the back surface of camera body 2. When this selection switch 54 is ON, the trimming signal to indicate the pseudo focal length photographing mode is recorded to the side of the frame at a photographing position from trimming signal printer 56 disposed on the side of picture frame 2b of camera body 2. Reference numerals 58 and 60 designate, respectively, a film cartridge loaded in camera body 2 and a spool.

Figure 5:
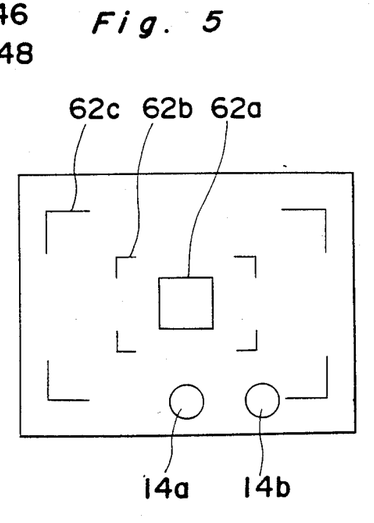
FIG. 5 is an illustration showing the condition of the in-finder indication.

In FIG. 5, an image 62c of the photographing frame 12c to indicate the photographing range in real focal length photographing mode is indicated in the outermost side of the visual field of the viewfinder described in this embodiment, an image 62b of the photographing frame 12b to indicate the range to be printed in the pseudo focal length photographing mode is indicated inside the image 62c, and an image 62a of the range-finding frame 12a to indicate the area to be measured is indicated in the center of the viewfinder field. Thus, at the time of photographing in the pseudo focal length photographing mode, the light emitting diode 14a for the indication of the pseudo focal length photographing mode illustrated in FIG. 1 lights up, and the frame indication illustrated in FIG. 5 appears in the visual field of the viewfinder in order to let the user know that the camera is in the pseudo focal length photographing mode. When the brightness of the object is lower than the predetermined level, low brightness alarm light emitting diode 14b lights up to warn the user that the brightness is lower than the predetermined level.

Figure 6:
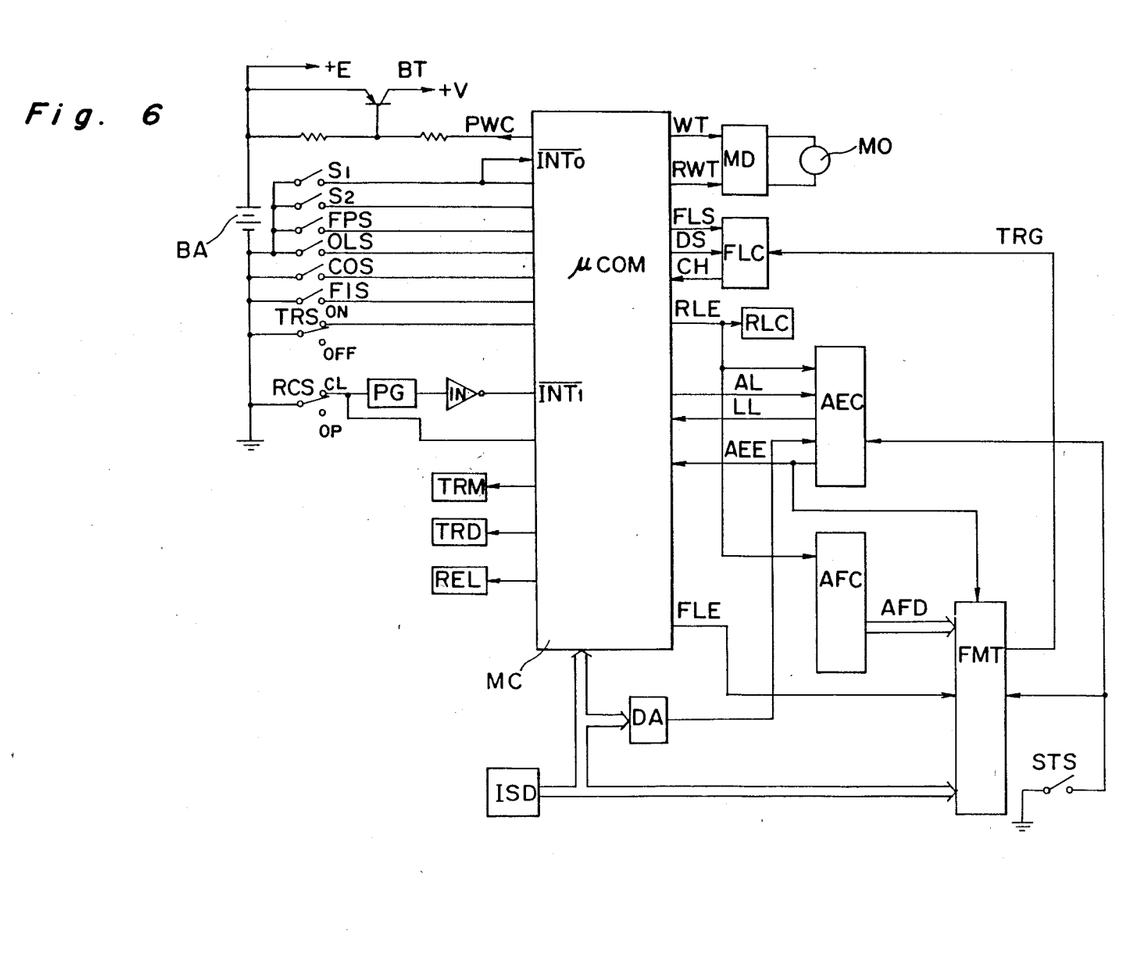
FIG. 6 is a block diagram of an electric circuit of the above camera.

The composition and operation of the electric circuit according to this embodiment will be explained in the following. Referring to FIG. 6, which shows a circuit diagram according to this embodiment, reference symbol S₁ designates a photometric switch which becomes ON when shutter release button 22 is depressed to its first position, and reference symbol S₂ designates a release switch which becomes ON when shutter release button 22 is depressed to its second position deeper than the first position. Reference symbol FPS designates one-frame switch which becomes ON when the film is wound up for one frame. Reference symbol OLS designates an overload detection switch which becomes ON when a film winding mechanism is overloaded during the winding operation due to the reasons such as unsmooth movement of the film.

Reference symbol COS designates a counter switch to count the number of film frames. The film counter used in this embodiment is designed so that it is reset to the "S" position when the back cover 36 is opened, and the counter becomes operable when the back cover 36 is closed. This film counter is designed to count up like S→.→.→1→2 as the film is wound up from one frame to another. In this case, the code "." indicated the frame wound without counting up. This counter switch COS is kept OFF until the counter proceeds to 1. In the case of the camera described in this embodiment, after the back cover 36 is closed, the count number of the counter reaches "1" to cause the counter switch COS to become ON, and the preparatory feed of the film is continued until the one-frame switch FPS becomes ON.

Reference symbol FIS designates a film detection switch, which becomes OFF when the film is loaded in the camera, and ON when the camera is not loaded with the film. In the camera described in this embodiment the, ON/OFF state of the switch FIS is discriminated during the rewinding operation of the film, and, when it is detected that the switch FIS is in the OFF state, the rewinding operation is stopped.

Reference symbol TRS designates a trimming switch interlocked with the selection switch 54 shown in FIG. 4, which indicates the pseudo focal length photographing mode to record the trimming signal on the film when it is ON, and the real focal length photographing mode wherein the trimming signal is not recorded when it is OFF.

Reference symbol RCS designates a back cover switch, which is connected to a terminal CL when back cover 36 is closed and transferred to a terminal OP when the back cover 36 is open. When the position of this switch RCS is changed, a pulse is outputted from a pulse generator PG, and the pulse is inputted to an interruption terminal INT₁ of a microcomputer MC through an inverter IN.

Reference symbol TRM indicates the light source of trimming signal printer 56. Reference symbol TRD designates an indicator including light emitting diode 14a for indicating the pseudo focal length photographing mode in the viewfinder. Reference symbol REL designates a low brightness alarm indicator including the low brightness alarm light emitting diode 14b, which generates an alarm signal when the measured brightness of the object is lower than the predetermined level, and the shutter release operation is interrupted because the change up of the main capacitor in the flash portion is not completed.

Reference symbol MD designates a motor drive circuit to drive a motor MO used for the winding and rewinding of the film, which causes the motor MO to turn towards the normal direction to wind the film when the position of the output terminal WT of microcomputer MC becomes "Low" and causes the motor MO to turn towards the reverse direction to rewind the film when the state of the output terminal RWT of the microcomputer becomes "Low". Furthermore, when the states of the output terminals WT and RWT are both "Low", both ends of the motor MO are short-circuited for a certain period of time to brake the motor.

Reference symbol FLC designates a flash circuit for illuminating the object with the flash portion 24, wherein when the state of the output terminal FLS of the microcomputer MC becomes "Low", the boosting circuit included in the flash circuit is actuated in order to charge the main capacitor; when the state of the output terminal DS becomes "Low", the voltage of the main capacitor is detected, when the charging voltage is above a predetermined level, the state of an input terminal CH of said microcomputer MC becomes "High"; and the flash light is emitted in response to the pulse of the signal TRG from a flash control timer FMT which will be explained later.

Reference symbol RLC designates a release circuit for starting the automatic focusing operation of the photographing lens which has been preset in a designated position in the camera body by changing the lens. This release circuit RLC is actuated to change the axial position of the lens when the state of the output terminal RLE of the microcomputer MC becomes "Low".

Reference symbol AEC indicates an automatic exposure control circuit (hereinafter referred to as AE circuit), which is designed so that when the state of an output terminal PWC of the microcomputer MC becomes "Low" to cause the power transistor BT to be ON, the AE circuit AEC starts its light measuring operation and exposure calculation operation while being supplied electric power through a power supply line +V. The AE circuit AEC determines the exposure value Ev on the basis of the digital signal representing the film sensitivity Sv transmitted from the DA converter DA and the brightness Bv measured by the photometric circuit included in the AE circuit. When the state of the output terminal AL of the microcomputer MC becomes "Low", the exposure value Ev at this moment is stored (so-called "AE lock"), and when the stored exposure value Eva is below a predetermined level, the state of an input terminal LL to the microcomputer MC becomes "Low".

When the automatic focusing is completed, and the shutter begins to open by means of its mechanical linkage with the automatic focusing mechanism, a switch STS becomes ON, the signal representing the degree of opening of the shutter is outputted from a variable resistor (not shown in drawing); the locked exposure value Eva is compared with the exposure value Evb corresponding to the signal from the variable resistor, and when they both agree with each other, the magnet that serves to induce the shutter to close becomes OFF to let the shutter start the action to close. The shutter used in this embodiment operates as an aperture diaphragm, and the combination of the aperture of the diaphragm and the exposure time to the specified exposure value Ev is predetermined. The aforementioned magnet for inducing the closing action of the shutter becomes ON when the state of the output terminal RLE of the microcomputer MC becomes "Low".

Reference symbol AFC designates the automatic focusing circuit (hereinafter referred to as AF circuit) for automatically focusing the photographing lens, which is designed so that when a power transistor BT becomes ON, the electric power supply through the power supply line (+V) is started first to cause the start of range-finding action; the range-finding data concerning the distance to the object is memorized; the range-finding data is trasmitted to the flash control timer FMT through a data bus AFD; when the release circuit RLC is actuated, the locking of the lens to the camera body is released to permit the lens to change its axial position; as the lens changes its position, an encoder included in the AF circuit AFC outputs a train of pulses corresponding to the movement of the lens; the number of pulses is counted in the AF circuit AFC; when the range-finding data and this counted value agree with each other, not only the movement of the lens is stopped but also the lens is locked to the camera body; and the position of the lens is adjusted according to the range-finding data.

Reference symbol ISD designates a film sensitivity data output circuit, wherein a code plate designed to generate the digital signal according to the sensitivity of the film is provided on the film cartridge so that the data from the code plate can be read out to output it as the film sensitivity data. When the film cartridge is not loaded in the camera, or when the film cartridge without the code plate is loaded in the camera, the predetermined value is outputted as the film sensitivity data. This digital film sensitivity data is not only transmitted directly to the microcomputer MC and the flash control timer FMT but also converted into analog data through DA converter DA in order to be transmitted to AE circuit AEC.

Reference symbol FMT designates a flash control timer, which decodes the data for the timer to be used for indicating the timing to emit the flashlight, according to the range-finding data which is inputted from the AF circuit AFC through the data bus AFD and the film sensitivity data from the film sensitivity data output circuit ISD. The time period corresponding to the data for the timer to be decoded is equivalent to the time period between the time when the shutter starts to open (time when the switch STS becomes ON) and the time when the opening diameter of shutter diaphragm reaches the level at which the proper exposure can be obtained by the flashlight. Here, there is the possibility the distance to the object is too long to obtain the proper exposure even if the shutter diaphragm is fully opened. Thus, the shutter system is designed so that the closing action of the shutter starts by an exposure time limitation system when the diaphragm is fully opened. When the closing action of the shutter starts, the shutter closing signal is outputted from the output terminal AEE of AE circuit AEC. When this shutter closing signal is inputted to flash control timer FMT, the latter FMT outputs a light emitting pulse to the output terminal TRG to start the flashlight emission. The flash control timer FMT is designed so that the light emitting pulse is outputted from the output terminal TRG only when the output terminal FLE of the microcomputer MC is "Low".

Figures 7, 7A:
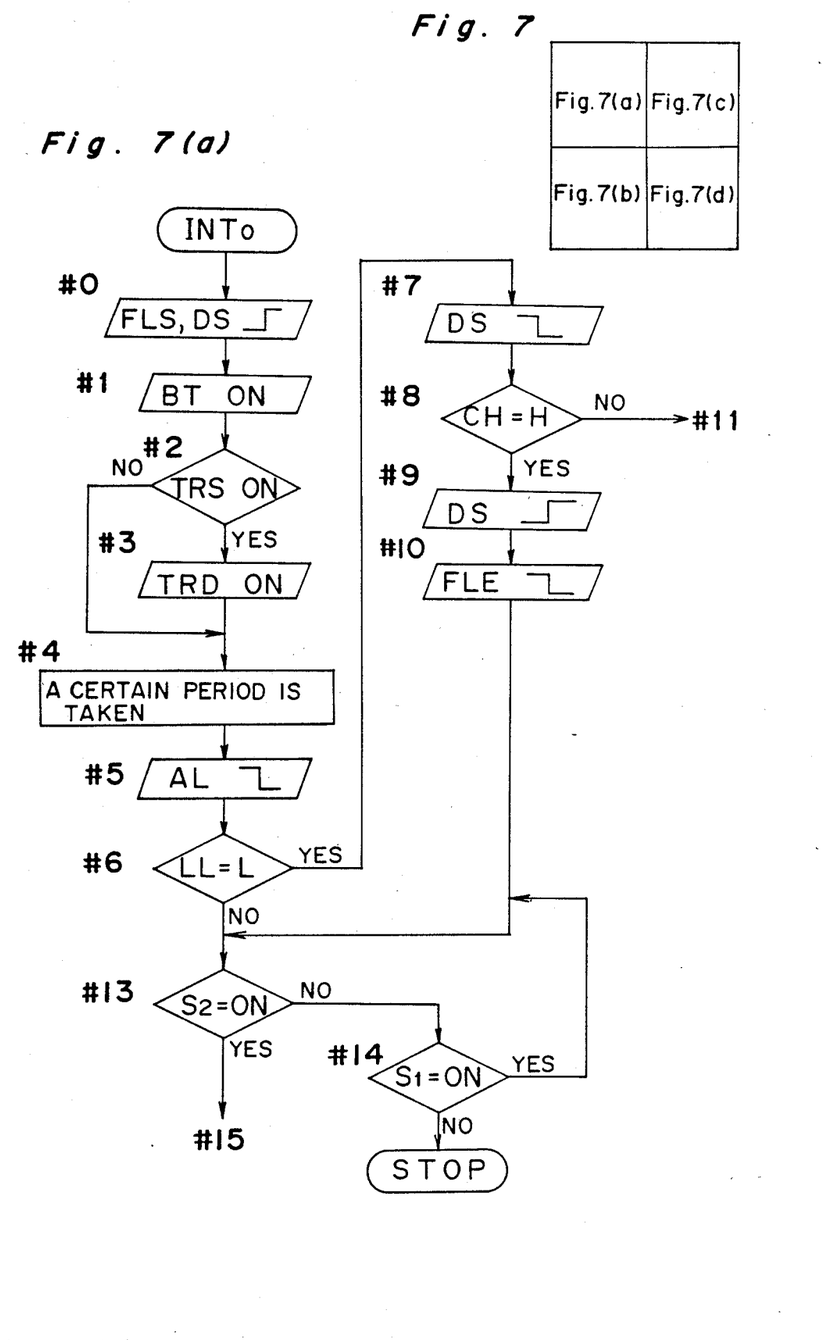
Figure 7B:
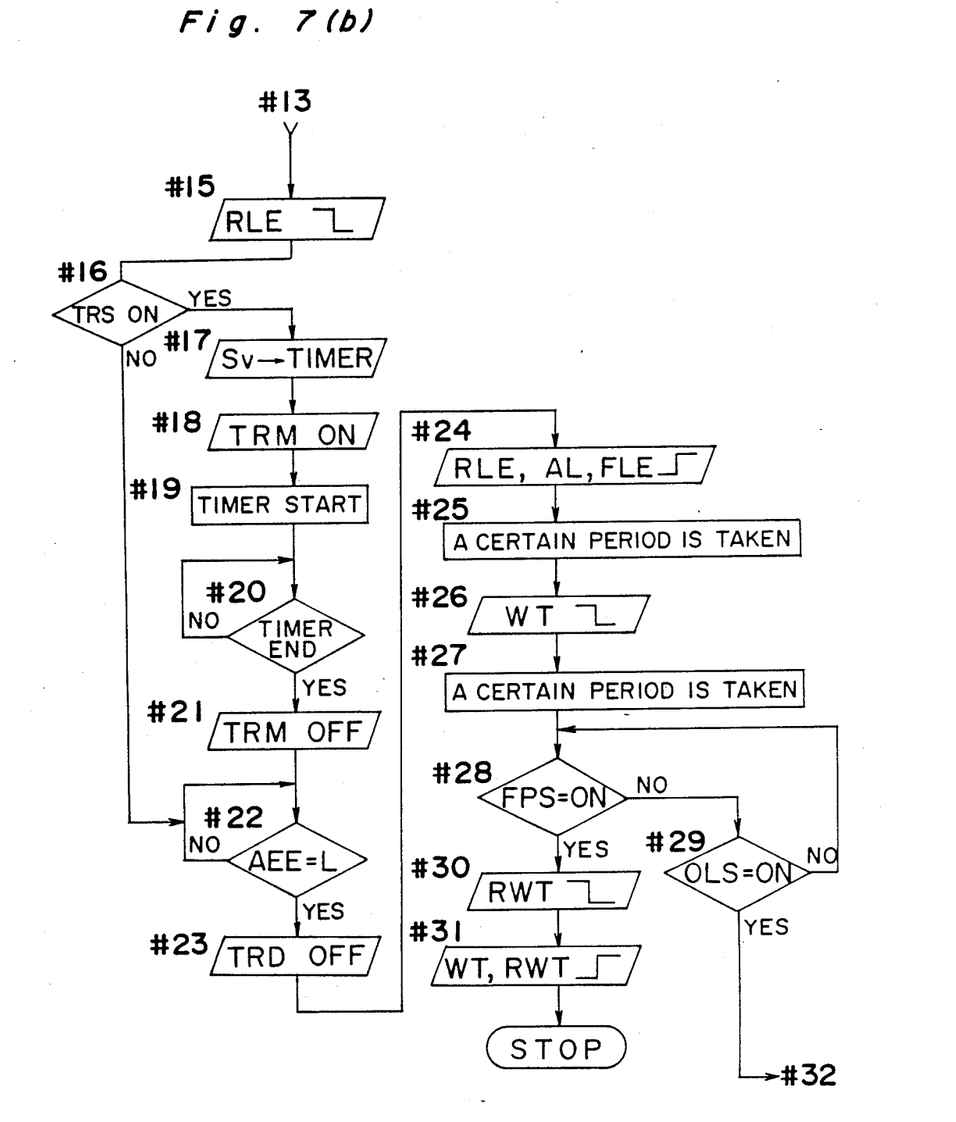
Figure 7C:
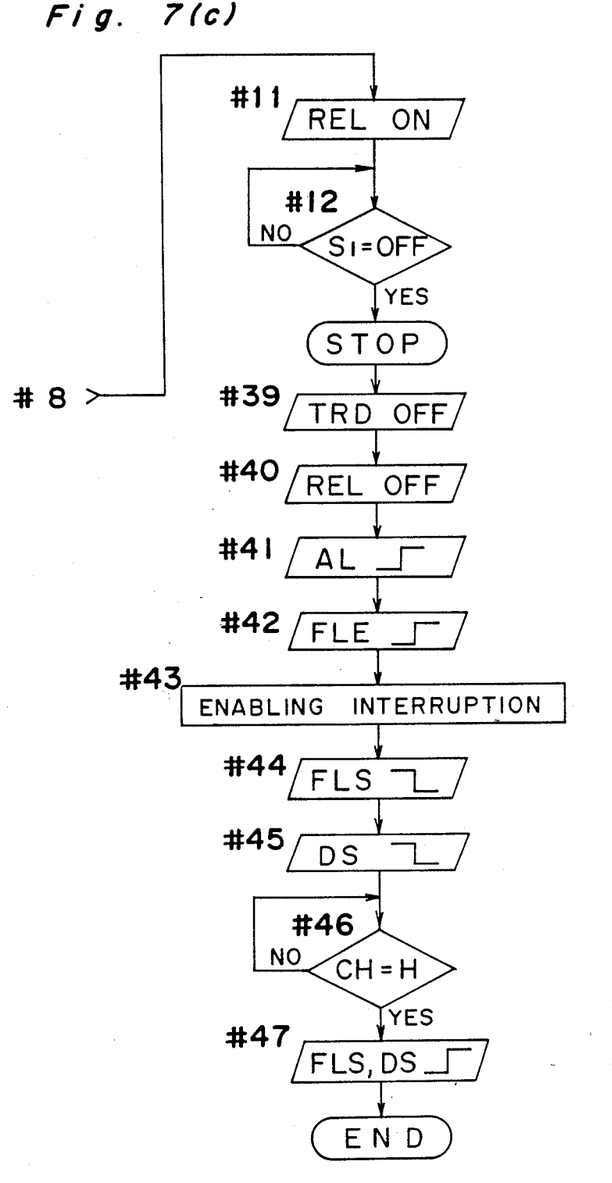
Figure 7D:
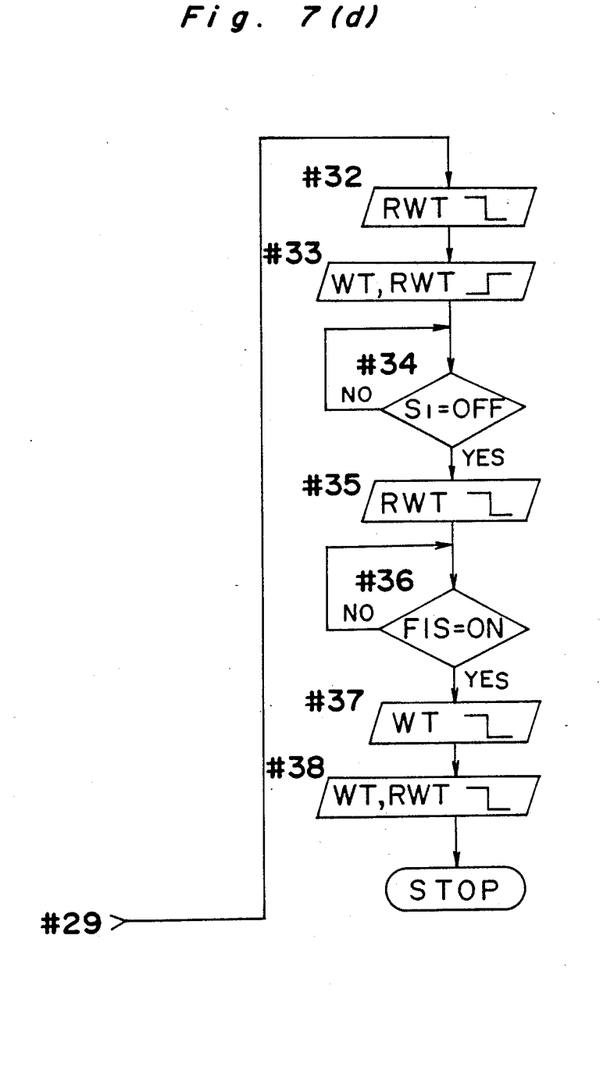
Figure 8:
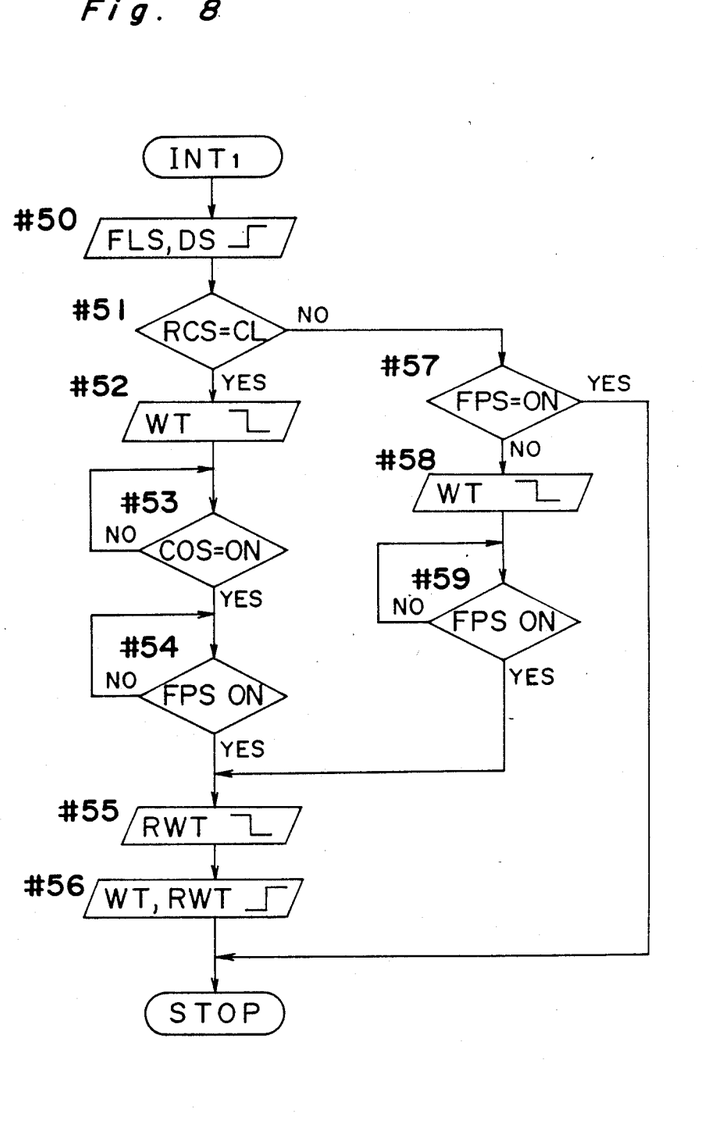

Next, the operation relating to this embodiment will be explained in reference to the flow charts shown in FIGS. 7 and 8. FIG. 7 shows a flow chart of the operation which take place when shutter release button 22 is operated, while FIG. 8 shows a flow chart of the operation of microcomputer MC which take place when the back cover 36 is operated.

When the shutter release button 22 is depressed to its first position, the photometric switch $S_1$ becomes ON to cause the interruption signal to be inputted to the interruption terminal $INT_0$ of microcomputer MC, and the interruption flow $INT_0$ beginning from step #0 starts (hereinafter the term "step" will be omitted).

At #0, the states of the output terminals FLS and DS are both set to "High" in preparation for the condition where the interruption is applied during the boosting operation when the flash circuit FLC is in progress. Next, at #1, the power transistor BT is set to ON to actuate the AE circuit AEC and AF circuit AFC respectively. At #2, the ON/OFF state of the trimming switch TRS is discriminated. When the trimming switch TRS is ON, and the mode is pseudo focal length photographing mode, the trimming mode indicator TRD is set to ON at #3 to cause the light emitting diode 14a for indicating the pseudo focal length photographing mode to light up. When trimming switch TRS is OFF, and the mode is real focal length photographing mode, the program proceeds to #4 directly from #2 while trimming mode indicator TRS remains OFF.

At #4, a certain period of time is taken for stabilizing the photometric circuit of the AE circuit AEC and for range finding operation of AF circuit AFC. When the certain period of time has passed, the output terminal AL is set to "Low" at #5 to make AE lock, and the exposure value Ev at this moment is stored in the memory within the AE circuit AEC. At #6, whether the stored exposure value Evz is below the predetermined level, namely whether the state of the output terminal LL of the AE circuit AEC is "Low" is checked. When the state of the output terminal LL is "Low", the program proceeds to #7, and the charged condition of the main capacitor for flash-light emission in flash circuit FLC is detected. At #8, whether the charging of the main capacitor is completed or not is checked by checking if the state of the output terminal CH of the flash circuit FLC is "High" or not. When the charged voltage of the main capacitor is below the predetermined level and the charging is incomplete, this indicates that the state of output terminal CH is "Low". In this case, at #11, the low brightness alarm indicator REL is set to ON to cause the light emitting diode 14b for low brightness alarm to light up. At #12, the program waits until photometric switch $S_1$ becomes OFF, and the program proceeds to the stop routine following #39 which will be explained later.

At #8, when it is detected that the state of the output terminal CH of the flash circuit FLC is "High" and that the charge of main capacitor is completed, the state of the output terminal DS of the microcomputer MC is set to "Low" at #9, and the charging condition detector for the main capacitor is set to OFF. At #10, the state of the output terminal FLE of microcomputer MC is set to "Low" at which the flashlight is emittable, and the action proceeds to #13.

At #13 and #14, the ON/OFF states of the release switch $S_2$ and photometric switch $S_1$ are discriminated respectively, and when the states of both are OFF, the program proceeds to the stop routine following #39 which will be explained later. On the other hand, when only the state of the photometric switch $S_1$ is ON, the program waits until the release switch $S_2$ becomes ON. When the release switch $S_2$ becomes ON, the program proceeds to the exposure control routine following #15. When release switch $S_2$ is ON, the action proceeds to the exposure control routine following #15 regardless of the state of photometric switch $S_1$.

The exposure control routine will be explained in the following. First at #15, the output terminal RLE of microcomputer MC is set to "Low" to actuate the release circuit RLC. At #16, whether the trimming switch TRS is ON or not is checked. When the trimming switch TRS is OFF, the mode is in real focal length photographing mode which will not require the trimming print, so that the program proceeds to #22. On the other hand, when the trimming switch TRS is ON, the mode is in pseudo focal length photographing mode wherein the trimming signal is printed on the film. First at #17, the time corresponding to the film sensitivity Sv is set to the timer included in the microcomputer MC. At #18, the power source TRM of the trimming signal printer 56 is set to ON. Simultaneously, the timer is started at #19. At #20, the program is suspended until the time corresponding to the film sensitivity is counted by the timer. When counting is completed, the power source TRM is set to OFF at #21, and the program proceeds to #22.

At #22, the state of the output terminal AEE of the AE circuit AEC becomes "Low", and this state continues until the shutter closing signal is generated. When the shutter closing signal is generated, the trimming mode indicator TRD is set to OFF at #23, and the light emitting diode 14a for indicating the pseudo focal length photographing mode becomes OFF. At #24, the output terminals RLE, AL and FLE of the microcomputer MC are set to "High" respectively. At #25, the program is suspended for a certain period of time until the shutter closing action completed. After this period of time, the microcomputer MC sets its output terminal WT to the "Low" state at #26 and causes the film winding action to be started.

At #27, the program is suspended for a certain period of time that is long enough until one-frame switch FPS becomes OFF. Then, at #28 and #29, the program is suspended until one-frame switch FPS or overload detection switch OLS becomes ON. Then, when one-frame switch FPS becomes ON at #28, the motor MO for winding the film is braked to stop its rotation by setting both the output terminal WT and the output terminal RWT to the "Low" state respectively at #30. At #31, both of the output terminals WT and RWT are reset to "High" state, and the program proceeds to the stop routine following #39.

On the other hand, when the overload detection switch OLS is found to be ON at #29, the program proceeds to rewinding routine after #32. In this rewinding routine, both the output terminal WT and the output terminal RWT of the microcomputer MC are set to the "Low" state at #32 to brake the motor MO in order to stop the winding action. AT #33, both of the output terminals WT and RWT are reset to the "High" state, and the program is suspended until the photometric switch $S_1$ becomes OFF at #34. When the OFF state of the photometric switch $S_1$ is discriminated, output terminal RWT is set to the "Low" state at #35 to let the motor MO turn reversely to effect rewinding action. At #36, the program is suspended until the film detection switch FIS becomes ON. When the film detection switch FIS becomes ON, this indicates that the film rewinding action is completed. At #37, the output terminal WT of the microcomputer MC is set to the "Low" state. At #38, both the output terminals WT and RWT are set to the "Low" state to brake and stop the motor MO, and the program proceeds to the stop routine following #39.

In the stop routine, first at #39, the pseudo focal length photographing mode indicator TRD is set to the OFF state to cause the light emitting diode 14a for pseudo focal length photographing mode indication to the OFF state. At #40, the low brightness alarm indicator REL is set to OFF to cause the light emitting diode 14b for low brightness alarm to the OFF state. At #41 and #42, both the output terminals AL and FLE of the microcomputer MC are reset to the "High" state, respectively, and the interruption from the interruption terminals $INT_0$ and $INT_1$ of the microcomputer MC is permitted at #43. At #44 and #45, the output terminals FLS and DS of the microcomputer MC are set to the "Low" state, respectively, to let flash circuit FLC perform boosting and charging detection operations.

Then, at #46, the program is suspended until the state of the output terminal CH of the flash circuit FLC becomes "High". When this output terminal becomes "High", and the charging of the main capacitor for the emission of flashlight is completed, the output terminals FLS and DS of the microcomputer MC are both set to "High" at #47, and both the boosting and charging detection operations of the flash circuit FLC are stopped. Then, the operation of the microcomputer MC is also stopped.

Next, the action of microcomputer MC when the back cover 36 relating to this embodiment is operated will be explained in reference to the flow chart shown in FIG. 8. When the back cover 36 is opened or closed to cause the position of the back cover switch RCS to be changed, the pulse is inputted to the interruption terminal $INT_1$ of the microcomputer MC, and the interruption flow shown in FIG. 8 will start. First at #50, just like the case of #0 shown in FIG. 7, the output terminals FLS and DS of microcomputer MC are both set to "High" state to let the flash circuit FLC perform a boosting operation and charging detection operation for the main capacitor. Then, at #51, whether the back cover switch RCS is connected to terminal CL or not is detected in order to check if the back cover 36 is opened or closed. When the back cover switch RCS is connected to the terminal CL, and the back cover is closed, the output terminal WT is set to "Low" state at #52, and the winding of film is started. Then, the program is suspended until the count switch COS becomes ON following the preparatory feed of the film. When the count switch COS becomes ON, the program is suspended until the one-frame switch FPS becomes ON at #54. Then, when the one-frame switch FPS becomes ON, program proceeds to #55, and the output terminal RWT of the microcomputer MC is set to "Low" state. At #56, both the output terminals WT and RWT are set to "Low" state, and the motor MO is braked to stop its rotation. Then, action proceeds to the stop routine following #39 shown in FIG. 7.

On the other hand, at #51, when it is discriminated that the back cover switch RCS is connected to the terminal OP, and the back cover 36 is open, the program proceeds to #58, where the output terminal WT of the microcomputer MC is set to "Low" state, and the winding of film is started. At #59, program is suspended until the one-frame switch FPS becomes ON. When the one-frame switch FPS becomes ON, program proceeds to #55 and #56, where the motor MO is braked to stop its rotation, and program proceeds to the stop routine following #39 shown in FIG. 7. At #57, when it is discriminated that the one-frame switch FPS is ON, program immediately proceeds to the stop routine following #39 shown in FIG. 7.

Furthermore, in this embodiment, the print area in the pseudo focal length photographing mode is limited to one range, but the print area according to the present invention is not limited to one range, so that the system according to the present invention may include the arrangement to enable the print range to be selected from plural number of trimming ranges. In such case, the system according to the present invention should be disigned so that the signal corresponding to the selected range can be recorded as the trimming signal. As the media whereon the trimming signal is to be recorded, not only the photographic film as is cited in this embodiment but also the magnetic card and the IC card may be used.

Furthermore, the waterproofing system according to the present invention is not necessarily limited to one applicable to the deep-sea operations but it may be those selectable depending on the operating conditions. For example, the waterproofing system for the camera intended for the shallow-sea operations is not required to be provide with the waterproofing system for the deep-sea operation. Besides, the waterproofing system relating to the present invention may include the waterproofing system that is intended for the protection of the camera from the rainwater and other waterdrops.

Although the present invention has fully been described in connection with the preferred embodiments thereby with reference to the accompanying drawings, it is to be noted that various changes and modifications are apparent to those skilled in the art. Such changes and modifications are, unless they depart from the scope of the present invention, to be construed as included therein.

What is claimed is:

1. A waterproof camera comprising:
   means for selecting a real focal length photographing mode and for selecting a pseudo focal length photographing mode that specifies a scope for printing that is narrower than the scope in the real focal length photographing mode;
   means for recording a signal corresponding to the pseudo focal length photographing mode when the pseudo focal length photographing mode is selected; and
   waterproof means for preventing water from entering inside the camerA while permitting said means for selecting to be physically manipulated, said waterproof means enclosing an objective lens of the camera so that the focal length of the objective lens cannot be varied through physical manipulation.

2. A waterproof camera as claimed in claim 1, further comprising a viewfinder to be used for observing the subject of photographing, and
   a display means for indicating the printing range within a visual field of the viewfinder according to the selected mode.

3. A waterproof camera as claimed in claim 2, wherein said display means is so designed as to indicate a frame to define the printing range to be determined according to each mode within the visual field of the viewfinder.

4. A waterproof camera as claimed in claim 3, wherein said display means is so designed as to introduce light from a top surface of the camera and indicate a frame within the visual field of the viewfinder.

5. A waterproof camera as claimed in claim 1, wherein said waterproof means comprises:
   a first waterproof member disposed in front of a photographing lens in order to prevent water from entering inside the camera through the front of the photographing lens,
   a second waterproof member disposed in front of an optical system of a viewfinder in order to prevent water from entering inside the camera through a front of the optical system of the viewfinder,
   means for holding a last lens of the optical system of the viewfinder in order to prevent water from entering inside the camera through a back of the optical system of the viewfinder, and
   means for preventing water from entering inside the camera through a gap between a camera body and a back lid that is openable for loading and unloading of a film.

6. A waterproof camera as claimed in claim 1, further comprising a photographing lens, wherein selection of the real focal length photographing mode and the pseudo focal length photographing mode are, respectively, independent of a focal length of the photographing lens.

7. A waterproof camera comprising:
   means for selecting a real focal length photographing mode and a pseudo focal length photographing mode that specifies a scope for printing that is narrower than the scope in the real focal length photographing mode;
   means for recording a signal corresponding to the pseudo focal length photographing mode when the pseudo focal length photographing mode is selected;
   waterproof means for preventing water from entering inside the camera;
   a photographic lens; and
   an optical system of a viewfinder,
   wherein selection of the real focal length photographing mode and the pseudo focal length photographing mode is independent of both a focal length of the photographing lens and a focal length of the optical system of the viewfinder.

8. A waterproof camera as claimed in claim 7, wherein said means for selecting is not mechanically coupled to said photographic lens or said optical system of a viewfinder.

9. A waterproof camera comprising:
   means for selecting a real focal length photographing mode and for selecting a psuedo focal length photographing mode that specifies a scope for printing that is narrower than the scope in the real focal length photographing mode;
   means for recording a signal corresponding to the pseudo focal length photographing mode when the pseudo focal length photographing mode is selected;
   waterproof means for preventing water from entering inside the camera;
   a viewfinder for use in observing the subject to be photographed;
   means for indicating the printing range within a visual field of the viewfinder according to the selected mode, said indicating means being designed so as to indicate a frame to define the printing range to be determined according to each mode within the visual field of the viewfinder and said indicating means also being designed so as to introduce light from a top surface of the camera and indicate a frame within the visual field of the viewfinder.

10. An improved waterproof camera of a compact size capable of selectively taking a wide angle picture and a telephoto picture, wherein the improvement comprises:

means for selecting between first and second modes of photography, the first mode corresponding to real focal length photography for effecting the wide angle picture and the second mode corresponding to pseudo focal length photography for effecting the telephoto picture, wherein movement of an objective lens of the camera for purposes of varying its focal length is not necessary in order to select between the first and second modes of photography;

means for storing a signal when the second mode is selected, the signal being stored for indicating that a scope narrower than an ordinary scope of a specific frame of the film is to be printed with a greater magnification to form the same size of print as that formed in the first mode; and a watertight casing.

11. A waterproof camera as claimed in claim 10, wherein said means for selecting is not mechanically coupled to said objective lens.

12. A waterproof camera comprising:

means for selecting a real focal length photographing mode and for selecting a pseudo focal length photographing mode that specifies a scope for printing that is narrower than the scope in the real focal length photographing mode;

means for recording a signal corresponding to the pseudo focal length photographing mode when the pseudo focal length photographing mode is selected; and waterproof means for preventing water from entering inside the camera, said waterproof means having an appearance that is substantially the same when the real focal length photographing mode is selected as when the pseudo focal length photographing mode is selected.

13. A waterproof camera comprising:

an objective lens;

means for selecting a real focal length photographing mode and for selecting a pseudo focal length photographing mode that specifies a scope for printing that is narrower than the scope in the real focal length photographing mode, said means for selecting being adapted to select the real focal length photographing mode and the pseudo focal length photographing mode without manipulation of the object lens or any part mechanically coupled to said objective lens;

means for recording a signal corresponding to the pseudo focal length photographing mode when the pseudo focal length photographing mode is selected; and waterproof means for preventing water from entering inside the camera.

14. A waterproof camera comprising:

a photographic lens whose focal length is fixed;

means for selecting a real focal length photographing mode and a pseudo focal length photographing mode that specifies a scope for printing that is narrower than the scope in the real focal length photographing mode;

means for recording a mode signal corresponding to the pseudo focal length photographing mode when the pseudo focal length photographing mode is selected;

waterproof means for preventing water from entering inside the camera while permitting said means for selecting to be physically manipulated, said waterproof means enclosing an objective lens of the camera so that the focal length of the objective lens cannot be varied through physical manipulation.

15. A waterproof camera comprising:

means for selecting a real focal length photographing mode and a pseudo focal length photographing mode that specifies a scope for printing that is narrower than the scope in the real focal length photographing mode;

means for recording a mode signal corresponding to the pseudo focal length photographing mode when the pseudo focal length photographing mode is selected;

waterproof means for preventing water from entering inside the camera;

a photographic lens whose focal length is fixed;

an optical system of a viewfinder, wherein selection of the real focal length photographing mode and the pseudo focal length photographing mode is independent of a focal length of the optical system of the viewfinder.

16. An improved waterproof camera of a compact size capable of selectively taking a wide angle picture and a telephoto picture, wherein the improvement comprises:

means for selecting between first and second modes of photography, the first mode corresponding to real focal length photography for effecting the wide angle picture and the second mode corresponding to pseudo focal length photography for effecting the telephoto picture, wherein an objective lens of the camera does not move when the photographing mode is changed from the first mode to the second mode;

means for storing a signal when the second mode is selected, the signal being stored for indicating that a scope narrower than an ordinary scope of a specific frame of the film is to be printed with a greater magnification to form the same size of print as that formed in the first mode; and a watertight casing.

17. A waterproof camera comprising:

a photographic lens whose focal length is fixed;

means for selecting a real focal length photographing mode and a pseudo focal length photographing mode that specifies a scope for printing that is narrower than the scope in the real focal length photographing mode;

means for recording a mode signal corresponding to the pseudo focal length photographing mode when the pseudo focal length photographing mode is selected;

waterproof means for preventing water from entering inside the camera, said waterproof means having an appearance that is substantially the same when the real focal length photographing mode is selected as when the pseudo focal length photographing mode is selected.

18. A waterproof camera comprising:

an objective lens whose focal length is fixed;

means for selecting a real focal length photographing mode and for selecting a pseudo focal length photographing mode that specifies a scope for printing that is narrower than the scope in the real focal length photographing mode, said means for selecting being adapted to select the real focal length photographing mode and the pseudo focal length photographing mode without manipulation of the objective lens;

means for recording a mode signal corresponding to the pseudo focal length photographing mode when the pseudo focal length photographing mode is selected;

waterproof means for preventing water from entering inside the camera.

19. A waterproof camera comprising:

means for selecting a real focal length photographing mode and a pseudo focal length photographing mode that specifies a scope for printing that is narrower than the scope in the real focal length photographing mode;

means for recording a mode signal corresponding to the pseudo focal length photographing mode when the pseudo focal length photographing mode is selected;

waterproof means for preventing water from entering inside the camera while permitting the means for selecting to be physically manipulated, said waterproof means enclosing an objective lens of the camera so that the focal length of the objective lens cannot be changed through physical manipulation;

means for outputting a release signal;

means for measuring brightness of an object to output a brightness signal corresponding to the measured brightness;

means, responsive to the release signal, for controlling an exposure in accordance with the brightness signal; and means for automatically winding a film in response to the completion of the exposure.

20. A waterproof camera as claimed in claim 19, including a first operable member that is operated when new film is loaded, said means for outputting including a second operable member that is manually operated and means for outputting the release signal in response to the operation of said second operable member, said waterproof means enclosing parts of said camera such that the only movable parts of said camera that can be physically manipulated from the exterior of said waterproof means are the means for selecting and said first and second operable members.

21. A waterproof camera comprising:

means for selecting a real focal length photographing mode and a pseudo focal length photographing mode that specifies a scope for printing that is narrower than the scope in the real focal length photographing mode;

means for recording a mode signal corresponding to the pseudo focal length photographing mode when the pseudo focal length photographing mode is selected;

waterproof means for preventing water from entering inside the camera;

a photographic lens;

an optical system of a viewfinder;

means for outputting a release signal;

means for measuring brightness of an object to output a brightness signal corresponding to the measured brightness;

means, responsive to the release signal, for controlling an exposure in accordance with the brightness signal; and means for automatically winding a film in response to the completion of the exposure, wherein selection of the real focal length photographing mode and the pseudo focal length photographing mode is independent of both a focal length of the photographic lens and a focal length of the optical system of the viewfinder.

22. A waterproof camera as claimed in claim 21, further including a first operable member that is operated when new film is loaded, said means for outputting including a second operable member that is manually operated and means for outputting the release signal in response to the operation of said second operable member, said means for selecting and said first and second operable members being the only movable parts of said camera that are capable of being operated from the outside of said waterproof means.

23. An improved waterproof camera of a compact size capable of selectively taking a wide angle picture and a telephoto picture, wherein the improvement comprises:

means for selecting between first and second modes of photography, the first mode corresponding to real focal length photography for effecting the wide angle picture and the second mode corresponding to pseudo focal length photography for effecting the telephoto picture, wherein movement of an objective lens of the camera for purposes of varying its focal length is not necessary in order to select between the first and second modes of photography;

means for storing a signal when the second mode is selected, the signal being stored for indicating that a scope narrower than an ordinary scope of a specific frame of the film is to be printed with a greater magnification to form the same size of print as that formed in the first mode;

a watertight casing;

means for outputting a release signal;

means for measuring brightness of an object to output a brightness signal corresponding to the measured brightness;

means, responsive to the release signal, for controlling an exposure in accordance with the brightness signal; and means for automatically winding a film in response to the completion of the exposure.

24. A waterproof camera as claimed in claim 23, including a first operable member that is operated when new film is loaded, said means for outputting including a second operable member that is manually operated and means for outputting the release signal in response to the operation of said second operable member, said means for selecting and said first and second operable members being the only movable parts of said camera that are capable of being operated from the outside of said watertight casing.

25. A waterproof camera comprising:

means for selecting a real focal length photographing mode and a pseudo focal length photographing mode that specifies a scope for printing that is narrower than the scope in the real focal length photographing mode;

means for recording a mode signal corresponding to the pseudo focal length photographing mode when the pseudo focal length photographing mode is selected;

waterproof means for preventing water from entering inside the camera, said waterproof means having an appearance that is substantially the same when the real focal length photographing mode is selected as when the pseudo focal length photographing mode is selected;

means for outputting a release signal;

means for measuring brightness of an object to output a brightness signal corresponding to the measured brightness;

means, responsive to the release signal, for controlling an exposure in accordance with the brightness signal; and means for automatically winding a film in response to the completion of the exposure.

26. A waterproof camera as claimed in claim 25, including a first operable member that is operated when new film is loaded, said means for outputting including a second operable member that is manually operated and means for outputting the release signal in response to the operation of said second operable member, said means for selecting and said first and second operable members being the only movable parts of said camera that are capable of being operated from the outside of said waterproof means.

27. A waterproof camera comprising:
an objective lens;

means for selecting a real focal length photographing mode and for selecting a pseudo focal length photographing mode that specifies a scope for printing that is narrower than the scope in the real photographing mode, said selecting means being capable of selecting the real focal length photographing mode and the pseudo focal length photographing mode without manipulating the objective lens;

means for recording a mode signal corresponding to the pseudo focal length photographing mode when the pseudo focal length photographing mode is selected;

waterproof means for preventing water from entering inside the camera;

means for outputting a release signal;

means for measuring brightness of an object to output a brightness signal corresponding to the measured brightness;

means, responsive to the release signal, for controlling an exposure in accordance with the brightness signal; and means for automatically winding a film in response to the completion of the exposure.

28. A waterproof camera as claimed in claim 27, including a first operable member that is operated when new film is loaded, said means for outputting including a second operable member that is manually operated and means for outputting the release signal in response to the operation of said second operable member, said means for selecting and said first and second operable members being the only movable parts of said camera that are capable of being operated from the outside of said waterproof means.

* * * * *